United States Patent
Lewis et al.

(10) Patent No.: US 7,559,399 B2
(45) Date of Patent: Jul. 14, 2009

(54) MOTOR VEHICLE

(75) Inventors: Tim Lewis, Daventry (GB); Ian Gibson, Leamington Spa (GB); David Willey, Leamington Spa (GB); Robert Mackie, Leamington Spa (GB); Nigel Toney, Coventry (GB)

(73) Assignee: Jaguar Cars Limited (GB)

( * ) Notice: Subject to any disclaimer, the term of this patent is extended or adjusted under 35 U.S.C. 154(b) by 222 days.

(21) Appl. No.: 11/461,562

(22) Filed: Aug. 1, 2006

(65) Prior Publication Data
US 2007/0200359 A1    Aug. 30, 2007

(30) Foreign Application Priority Data
Aug. 2, 2005   (GB) .................................. 0515876.1

(51) Int. Cl.
*B60K 28/10* (2006.01)
*B60R 21/34* (2006.01)
(52) U.S. Cl. ..................................... 180/274; 180/69.21
(58) Field of Classification Search ................. 280/271, 280/274, 281; 296/193.11; 180/69.2, 69.21
See application file for complete search history.

(56) References Cited

U.S. PATENT DOCUMENTS

| 6,293,362 B1 * | 9/2001 | Sasaki et al. | 180/274 |
| 6,345,679 B1 * | 2/2002 | Sasaki | 180/274 |
| 6,554,093 B2 * | 4/2003 | Sasaki et al. | 180/274 |

(Continued)

FOREIGN PATENT DOCUMENTS

DE    10343106    10/2004

(Continued)

*Primary Examiner*—Ruth Ilan
*Assistant Examiner*—Drew J. Brown
(74) *Attorney, Agent, or Firm*—Brooks Kushman P.C.

(57) ABSTRACT

A vehicle has a vehicle body and a vehicle bonnet assembly. The vehicle bonnet assembly includes a bonnet 14 hinged at its front to the vehicle body 10 and latched at its rear by two latch devices. Each latch device comprises a latch assembly 17 mounted to the vehicle body 10 and a striker 21 mounted to the bonnet 14. Impact sensors are configured to detect a front collision with a pedestrian and two lift actuators 18 are arranged to raise the rear edge of the bonnet 14 into a deployed position in response to a pedestrian impact. Each latch assembly 17 includes a latch claw 26 moveable between a latch position in which the striker 21 is held by the latch claw 26 and a release position in which the striker 21 is releasable from the latch claw 26. Each latch assembly 17 also includes a release member 27 which is operable by a driver of the vehicle to allow the latch claw 26 to be moved towards its release position and allow the bonnet 14 to be lifted. A release actuator 32 is arranged to move the release member 27 and allow the latch claw 26 to be moved towards its release position and retain it in said position when the bonnet 14 is lifted by the lift actuators 18 in the event of a pedestrian impact. Each release actuators 32 is retained by a spring clip 37 which is attached to one end of a release tape 38 whose other end is connected to one of the lift actuators 18. The release tape 38 is normally hidden by the bodywork under the bonnet 14. However, when the bonnet 14 is moved to the deployed position by the lift actuators 18, the tape 38 is exposed and can be pulled to release the clip 37. The release actuator 32 can then pull away, allowing the latch assembly 17 to be re-set.

11 Claims, 6 Drawing Sheets

U.S. PATENT DOCUMENTS

| | | | |
|---|---|---|---|
| 7,073,846 B2 * | 7/2006 | Borg et al. | 296/187.13 |
| 7,195,090 B2 * | 3/2007 | Parks et al. | 180/271 |
| 7,303,040 B2 * | 12/2007 | Green et al. | 180/274 |
| 2002/0011372 A1 * | 1/2002 | Sasaki et al. | 180/274 |
| 2002/0014367 A1 * | 2/2002 | Sasaki et al. | 180/274 |

FOREIGN PATENT DOCUMENTS

| | | |
|---|---|---|
| EP | 1205365 | 10/2001 |
| EP | 1528201 | 10/2004 |
| GB | 2382548 | 10/2001 |

* cited by examiner

MOTOR VEHICLE

The present invention relates to a motor vehicle having a vehicle bonnet assembly and in particular to a vehicle bonnet assembly providing improved pedestrian safety.

In order to improve pedestrian safety it has become well known to mount the bonnet such that, in the event of a collision with a pedestrian, the bonnet is deployed automatically by being raised from its normal closed position to a partially raised position. See for example GB 2 382 548 which shows a vehicle bonnet assembly including a bonnet hinged at its front and latched at its rear, two latch assemblies respectively engageable with a striker on the bonnet. Each latch assembly is mounted to the vehicle body by a shear pin and is connected to a pyrotechnic cylinder assembly fixed to the vehicle body so that upon impact with a pedestrian the piston moves upwards, shearing the pins and lifting latch assemblies and the rear bonnet. Such an assembly requires a specific mounted plate to fix each assembly and the shear pin adds cost to the assembly.

According to the invention there is provided a vehicle having a vehicle body and a vehicle bonnet assembly including a bonnet hinged at its front to the vehicle body and latched at its rear to the vehicle body by at least one latch device, the or each latch device comprising a latch assembly mounted to one of the bonnet and the vehicle body and a striker mounted to the other of the bonnet and the vehicle body, impact sensors configured to detect a front collision with a pedestrian and at least one lift actuator arranged to raise the rear edge of the bonnet in response to a pedestrian impact, the latch assembly including a latch claw and a release member, the latch claw being moveable between a latch position in which the striker is held by the latch claw and a release position in which the striker is releasable from the latch claw and the release member being operable by a driver of the vehicle to allow the latch claw to be moved towards its release position and allow the bonnet to be lifted, wherein a release actuator is arranged to move the release member to allow the latch claw to be moved towards its release position and retain it in said position when the bonnet is lifted by the or each lift actuator upon a pedestrian impact.

Preferably, the release actuator has an actuator body which is fixed to the vehicle body by a releasable fastening device.

Also preferably, the releasable fastening device includes an auxiliary release means to allow the release actuator to be moved away from the release member so as to allow the latch claw to be moved back to its latch position, the auxiliary release means being arranged in such way that it can be operated manually by an operator only after the bonnet has being raised by the or each lift actuator.

Preferably, the auxiliary release means is connected to the lift actuator.

Conveniently, the releasable fastening device includes a retention clip adapted to be connected to the release actuator and an attachment for releasably attaching the release actuator to the vehicle body by the retention clip.

Preferably, the auxiliary release means includes a pull tape which is attached at one end to the retention clip and at its other end to a raising part of the lift actuator.

Also preferably, the pull tape is hidden by part of the vehicle body in a normal use of the bonnet.

In a preferred embodiment the release actuator includes a cylindrical piston and a cylindrical body in which a pyrotechnic charge is located so as to move the cylindrical piston.

Preferably the cylindrical body includes an annular groove and the attachment comprises a bracket attached to the vehicle body, the bracket being provided with a slot conformed to slidably receive the annular groove of the cylindrical body which is secured to the bracket by insertion of the retention clip into the groove.

Conveniently the latch claw of the or each latch assembly is spring-loaded towards its release position and the release member of the or each latch assembly is spring-loaded into the latch position and arranged to lock the latch claw, the release member including a latch pawl which is adapted to co-operate with the release actuator.

Also preferably the vehicle bonnet assembly comprises right and left latch devices and right and left lift actuators.

The invention will now be described by way of example with reference to the accompanying drawings of which:

Figure 3:
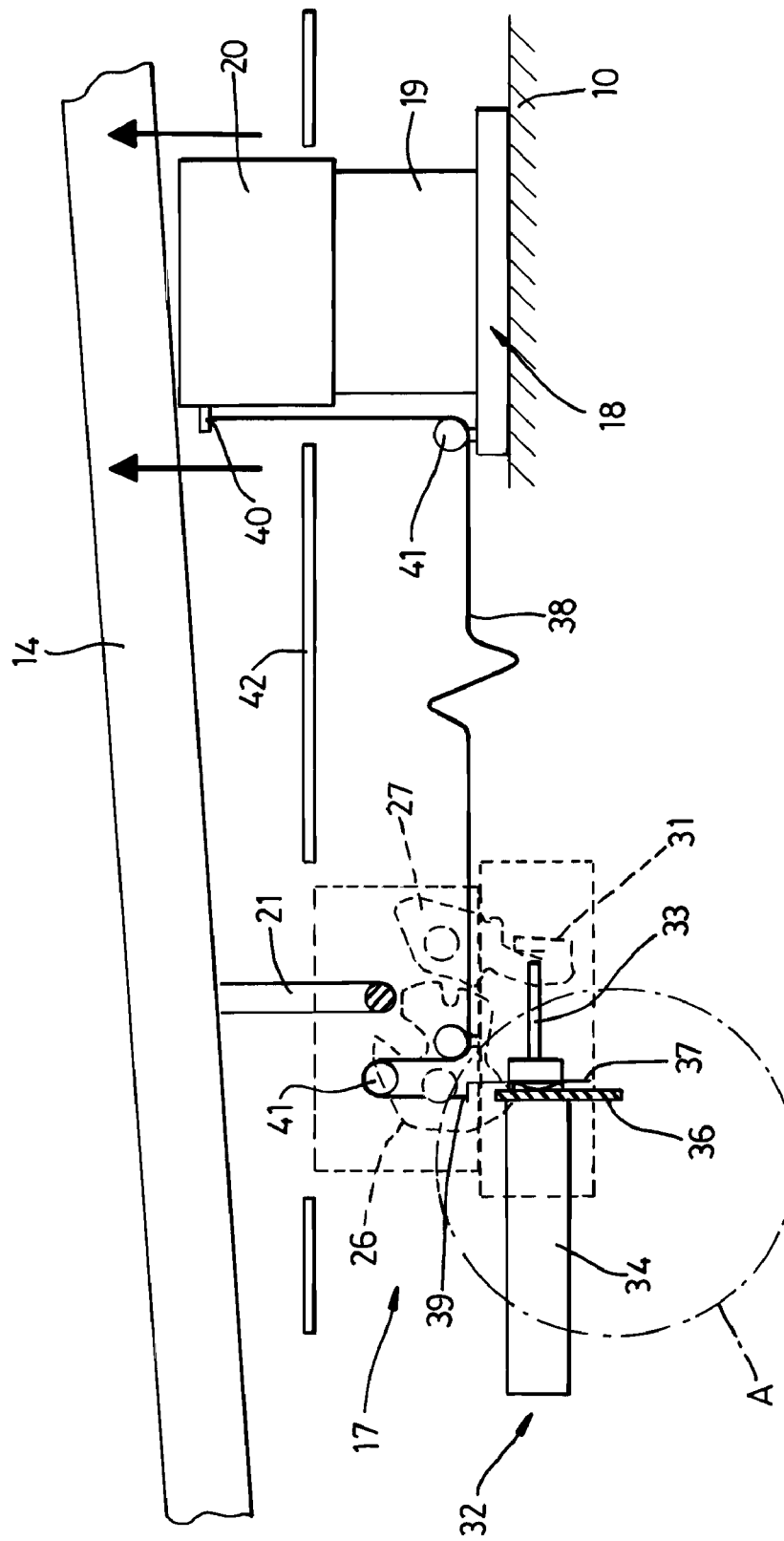
FIG. 3 is a view similar to FIG. 1 to larger scale showing part of the bonnet and the lift actuator in a deployed position and the latch assembly in an open or release position.
Figure 4:
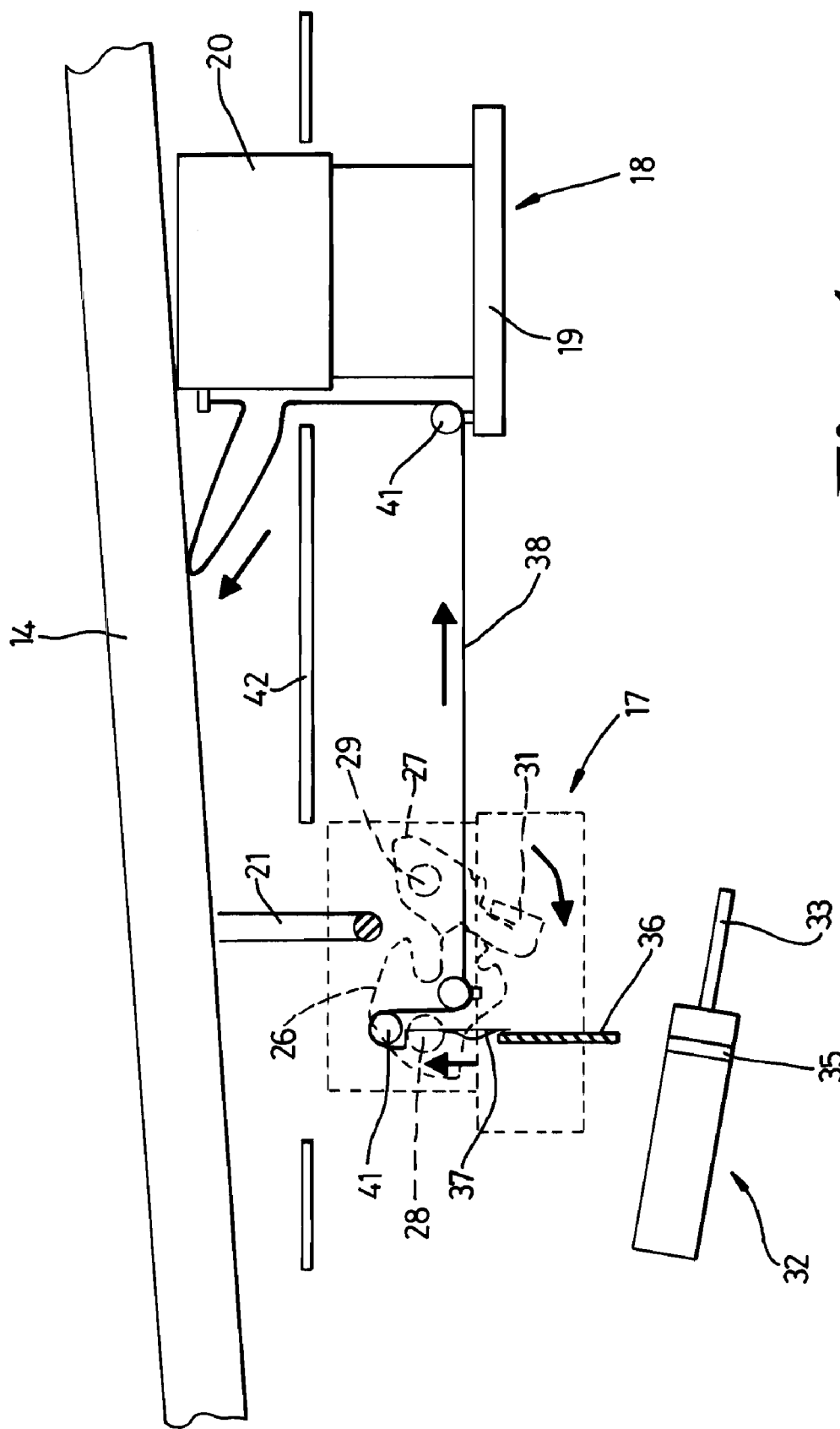
Figure 5:
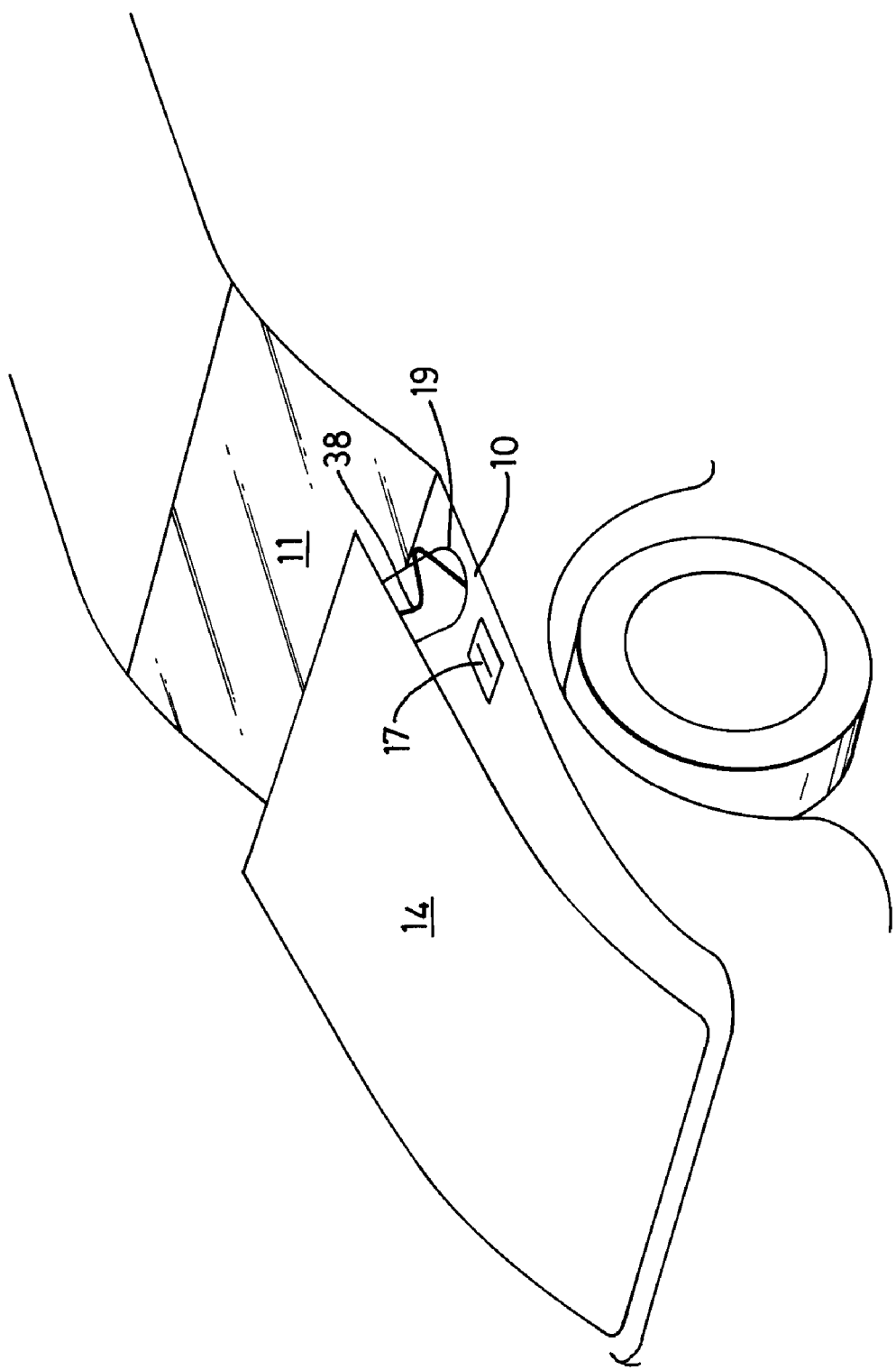
Figure 6:
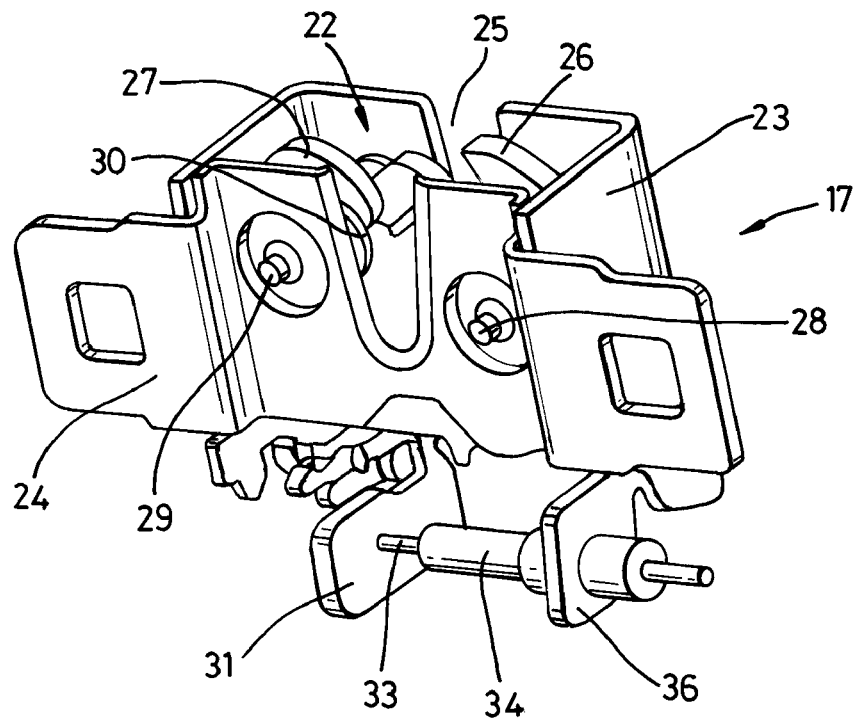
Figure 7:
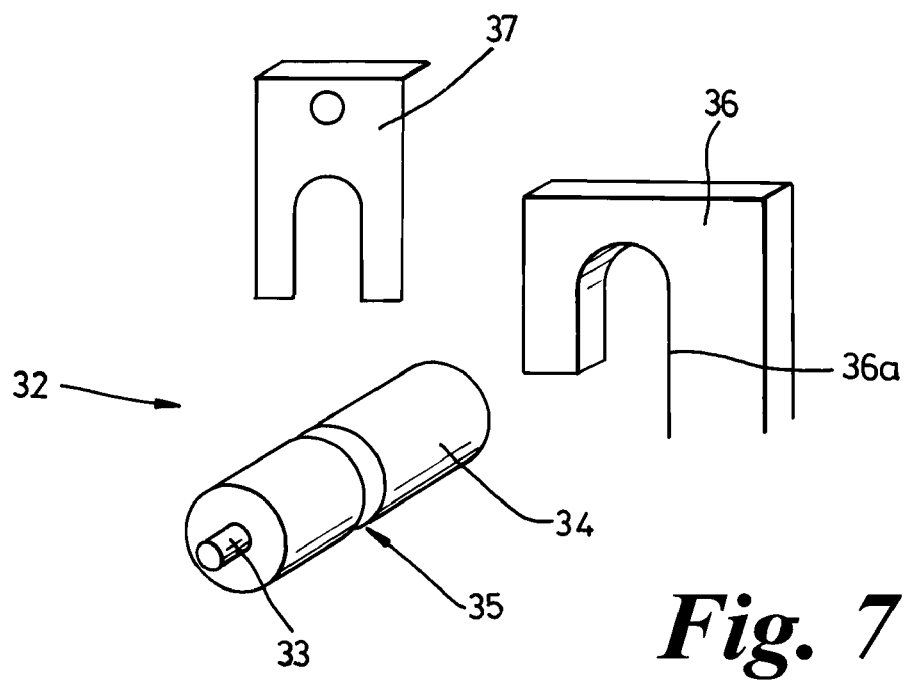

FIG. 4 is a view similar to FIG. 3 illustrating how the latch assembly is re-set to its latch position, FIG. 5 is a perspective view of the vehicle bonnet assembly from the outside of the vehicle showing the bonnet and lift actuator in a deployed position, FIG. 6 is a perspective scrap view of the latch assembly to a larger scale, and FIG. 7 is an exploded perspective scrap view of the circled part A in FIG. 3 to larger scale.

Figure 1:
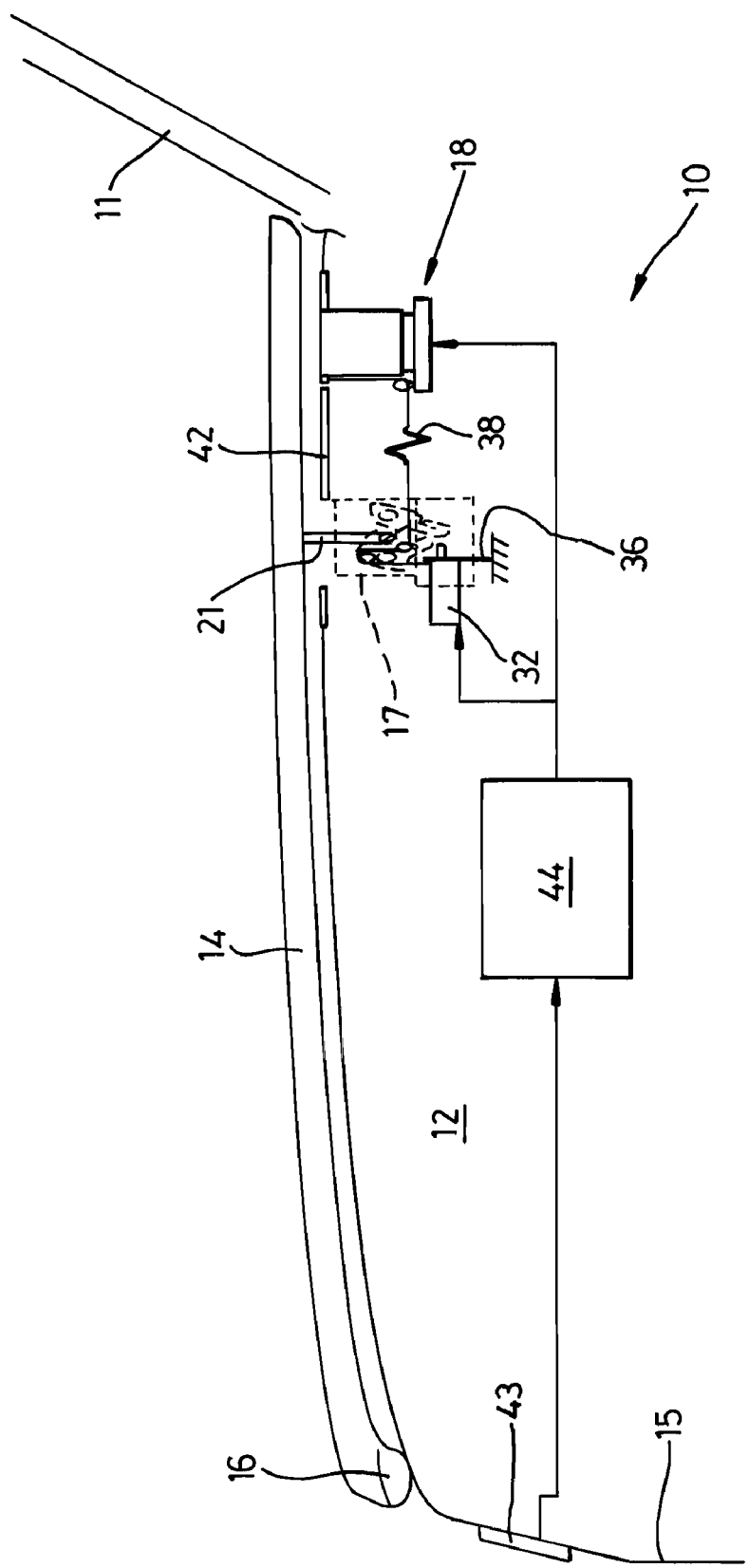
FIG. 1 is a schematic view of a front end portion of a vehicle employing a vehicle bonnet assembly in accordance with the present invention showing especially a bonnet, a latch assembly and a lift actuator.
Figure 2:
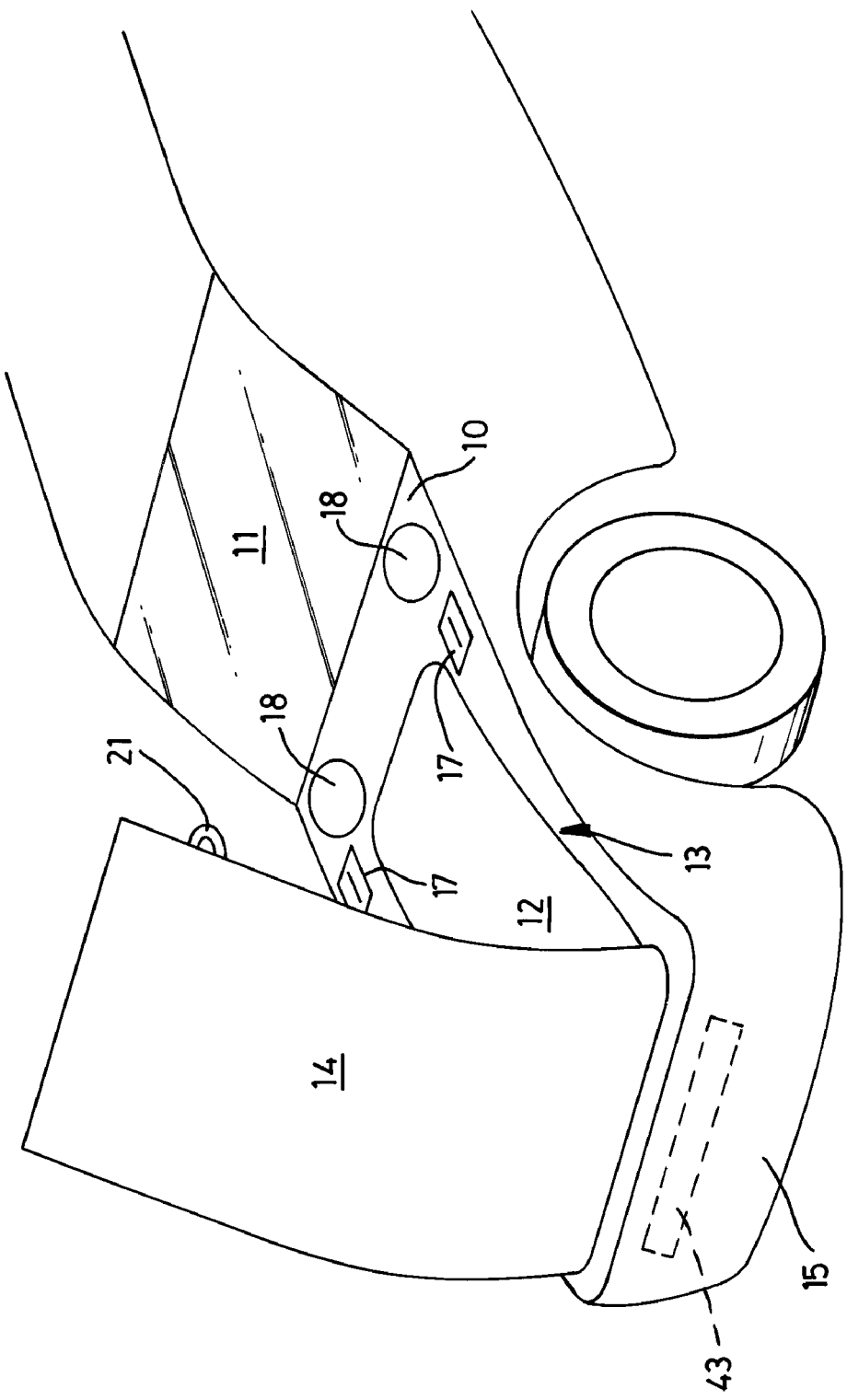
FIG. 2 is a perspective view of the front end of the vehicle shown in FIG. 1, with the bonnet in an open position.

With reference to the drawings and in particular FIGS. 1 and 2, there is shown a front end portion of a vehicle body 10 having a windscreen 11, an engine compartment 12 and a front bumper 15. The engine compartment 12 has an opening 13 covered by a front bonnet 14. The bonnet 14 is fixed to the vehicle body 10 by hinges 16 at its front end and by two spaced apart latch assemblies 17 located at the rear of the bonnet 14, conveniently referred to as right and left latch assemblies. Right and left lift actuators 18 are located between the vehicle body 10 and the rear edge of the bonnet 14. The lift actuators 18 together with the latch assemblies 16 and the bonnet 14 form part of a vehicle bonnet assembly.

Each lift actuator 18 includes in this example inflatable elements having a base 19 fixed to the vehicle body 10, a cylindrical sleeve 20 covering the base 19 and defining a chamber and a gas generator (not shown) as described in GB 2373218 and which is included in the description by reference and thus will not be further described.

Each latch assembly 17 is engageable, in a known manner, with a striker 21 having the form of a substantially U-shaped loop attached to the bonnet 14 and having a bar extending parallel to the bonnet 14 that can be retained in the latch assembly 17. Each latch assembly 17 and its corresponding striker 21 together form a latch device.

As can best be seen in FIG. 6, each latch assembly 17 comprises a housing 22 formed by two plates 23 having co-operating formations. Each plate 23, 24 has a slot 25 for receiving the striker 21. Contained within the housing 22 is a spring-loaded latch claw 26 that co-operates with a release member 27 in a conventional manner. The latch claw 26 is pivotally mounted on a first transverse pivot pin 28 located on one side of the slots 25 and the release member 27 is pivotally mounted on a second pivot pin 29 located on the other side of the slots 25. A biasing spring 30 is coaxially mounted on each transverse pin 28, 29. The release member 27 includes a ratchet to lock the latch claw 26 in a latch position (FIG. 4) and a projection lever or latch pawl 31 which can be displaced by a release actuator 32. In this example the release actuator 32 is a pyrotechnic device which includes a cylindrical piston 33 and a cylindrical actuator body 34 within which is located a pyrotechnical charge. The latch pawl 31 in a know manner is also connected by a cable (not shown) to a lever (not shown)

located inside the vehicle so as to release the latch claw 26 from the striker 21 thus allowing the bonnet 14 to be opened.

As can best be seen in FIG. 7, the cylindrical body 34 has an annular groove 35 and is secured to the vehicle body 10 by an attachment in the form of a bracket 36 fixed to the vehicle body 10 and having a slot 36a which is conformed to slidably receive the annular groove 35. The attachment also comprises a retention clip 37 which engages the annular groove 35 to secure the cylindrical body 34 to the bracket 36. In this example the retention clip 37 is a spring loaded clip having a substantially U-shaped form and which is inserted into the groove 35 next to the bracket 36. The clip 37 is attached in its upper part to an end 39 of an auxiliary release means in the form of a release tape 38 which runs along a portion of the vehicle body through a set of pulleys 41 fixed to the vehicle body 10 to be attached at its other end 40 to the cylindrical sleeve 20 of the lift actuator 18. The release tape 38 is hidden from sight in a normal operation of the bonnet 14 under a cover 42 fixed to the vehicle body 10 so as to prevent accidental release of the pyrotechnic device 32.

The vehicle bonnet assembly also comprises impact sensors 43 secured to the front bumper 15 and connected to a control unit 44. The control unit 44 is also connected to the gas generators of each lift actuator 18 and to the release actuators 31 of each latch assembly 17.

Operation of the bonnet assembly will now be described.

As seen in FIG. 1, the bonnet 14 is in its normal position, i.e. covering the engine compartment 12, and is retained by the two latch assemblies 17 in which each striker 21 is held by respective the latch claw 26 (FIG. 1). To open the bonnet 14 the driver pulls the lever located inside the vehicle, moving the release members 27 from the latch claws 26 of each latch assembly 17. Each latch claw 26 moves towards its release position under the force of its spring to a position where the strikers 21 can leave the housing 22 of each latch assembly 17 (FIG. 2).

When the bonnet 14 is pivoted back to its normal position the strikers 21 move the latch claws 26 back into the latch position and are locked by the ratchets of the release members 27 in a know manner.

In the event that the impact sensors 43 recognize that the vehicle has hit a pedestrian, the impact sensors 43 send a signal to the control unit 44 which controls the pyrotechnic charges of the right and left release actuators 32 and at the same time the gas generators of the right and left lift actuators 18.

Each release actuator 32 then moves the release member 27 enabling the spring-loaded latch claw 26 to take its release position, allowing the bonnet 14 to be displaced as the strikers 21 are no longer held by the latch claws 26. It will be appreciated that the release actuators 32 is configured to jam the release member 27 to retain it in the release position of the latch claw 26 to ensure that the bonnet 14 will be raised correctly. Meanwhile the gas generators of the lift actuators 18 are ignited moving the respective cylindrical sleeve 20 upwards and raising the rear of the bonnet 14 (FIG. 3) forming thus a cushion device in order to help avoid pedestrians being injured by hard objects under the bonnet 14. It will be appreciated that if the bonnet 14 is raised following ignition of the gas generators and operations of the release actuators 32 in response to an impact as mentioned above, the bonnet 14, if undamaged or not badly damaged cannot be re-latched on the latch device. This is because each release actuator 32 prevents the corresponding release member 27 from being moved back under the force of its spring and hence its associated latch claw 26 cannot move back to the latch position to allow the bonnet to be latched. To overcome this issue, the clip 37 and the release tape 38 act as a release fastening device to allow the release actuator 32 to be moved away from the release member 27.

As a result of the frontal impact, the end of the release tape 38 of each latch assembly 17 which is attached to the lift actuator 18 has been pulled upwards by the associated lift actuators 18 and can now be grasped by an operator or the driver. The driver or operator pulls each release tape 38 in order to decouple the spring clip 37 from the annular groove 35, releasing the body 34 of the release actuator 32 from the slot 36a of the bracket 36 and allowing the release member 27 to move back to its position where it locks the latch claws in the latch position. Then the bonnet 14 can be pushed down to its normal position where the strikers 21 will be held by the latch claws 26 and the lift actuator 18 be retracted. It will be appreciated that the length of the release tape 38 is sufficient to leave a small amount of slack when the bonnet 14 is deployed so that the lift actuator 18 cannot release the retention clip 37 when it is raised.

The vehicle bonnet assembly described here allows the latch assemblies 17 to be re-set in the event of minor damage to the bonnet 14 after impact so that the vehicle can be driven to a garage for replacement of the release actuators 32 and lift actuators 18 by a straightforward manual operation.

Although the invention has been described by way of an example with reference to a specific embodiment of the invention various modifications may be made without departing from the invention. For example, the vehicle bonnet assembly could include only one latch assembly and one lift actuator. In addition, the cylindrical body of the piston could be pivotally mounted to the vehicle body and held in an active position by a locking key connected to the release tape.

The invention claimed is:

1. A vehicle having a vehicle body and a vehicle bonnet assembly including a bonnet hinged at its front to the vehicle body and latched at its rear to the vehicle body by at least one latch device, the at least one latch device comprising a latch assembly mounted to one of the bonnet and the vehicle body and a striker mounted to the other of the bonnet and the vehicle body, impact sensors configured to detect a front collision with a pedestrian and at least one lift actuator arranged to raise the rear edge of the bonnet in response to a pedestrian impact, the latch assembly including a latch claw and a release member, the latch claw being moveable between a latch position in which the striker is held by the latch claw and a release position in which the striker is releasable from the latch claw and the release member being operable by a driver of the vehicle to allow the latch claw to be moved towards its release position and allow the bonnet to be lifted, wherein a release actuator is arranged to move the release member to allow the latch claw to be moved towards its release position and retain it in said position when the bonnet is lifted by the at least one lift actuator upon a pedestrian impact.

2. Vehicle as claimed in claim 1 wherein the release actuator has an actuator body which is fixed to the vehicle body by a releasable fastening device.

3. Vehicle as claimed in claim 2 wherein the releasable fastening device includes an auxiliary release means to allow the release actuator to be moved away from the release member so as to allow the latch claw to be moved back to its latch position, the auxiliary release means being arranged in such way that it can be operated manually by an operator only after the bonnet has being raised by the or each lift actuator.

4. Vehicle as claimed in claim 3 in which the auxiliary release means is connected to the lift actuator.

5. Vehicle as claimed in claim 3 in which the auxiliary release means includes a pull tape which is attached at one end to the retention clip and at its other end to a raising part of the lift actuator.

6. Vehicle as claimed in claim 5 in which the pull tape is hidden by part of the vehicle body in a normal use of the bonnet.

7. Vehicle as claimed in any one of claim 2 in which the releasable fastening device includes a retention clip adapted to be connected to the release actuator and an attachment for releasably attaching the release actuator to the vehicle body by the retention clip.

8. Vehicle as claimed in any one of claim 1 in which the release actuator includes a cylindrical piston and a cylindrical body in which a pyrotechnic charge is located so as to move the cylindrical piston.

9. Vehicle as claimed in claim 8 in which the cylindrical body includes an annular groove and the attachment comprises a bracket attached to the vehicle body, the bracket being provided with a slot conformed to slidably receive the annular groove of the cylindrical body which is secured to the bracket by insertion of the retention clip into the groove.

10. Vehicle as claimed in any one of claim 1 in which the latch claw of the latch assembly is spring-loaded towards its release position and the release member of the or each latch assembly is spring-loaded into the latch position and arranged to lock the latch claw, the release member including a latch pawl which is adapted to cooperate with the release actuator.

11. Vehicle as claimed in any one of claim 1, in which the vehicle bonnet assembly comprises right and left latch devices and right and left lift actuators.

* * * * *

UNITED STATES PATENT AND TRADEMARK OFFICE
CERTIFICATE OF CORRECTION

PATENT NO. : 7,559,399 B2
APPLICATION NO. : 11/461562
DATED : July 14, 2009
INVENTOR(S) : Tim Lewis et al.

Page 1 of 1

It is certified that error appears in the above-identified patent and that said Letters Patent is hereby corrected as shown below:

Column 4, Line 61, Claim 3:
After "bonnet has"
Delete "being" and insert -- been --.

Column 5, Line 4, Claim 7:
After "as claimed in"
Delete "any one of".

Column 5, Line 9, Claim 8:
After "as claimed in"
Delete "any one of".

Column 6, Line 5, Claim 10:
After "as claimed in"
Delete "any one of".

Column 6, Line 11, Claim 11:
After "as claimed in"
Delete "any one of".

Signed and Sealed this

Thirteenth Day of October, 2009

David J. Kappos
*Director of the United States Patent and Trademark Office*